United States Patent
Panttaja

(10) Patent No.: US 7,085,709 B2
(45) Date of Patent: Aug. 1, 2006

(54) METHOD AND SYSTEM FOR PRONOUN DISAMBIGUATION

(75) Inventor: Erin M. Panttaja, Somerville, MA (US)

(73) Assignee: Comverse, Inc., Wakefield, MA (US)

( * ) Notice: Subject to any disclaimer, the term of this patent is extended or adjusted under 35 U.S.C. 154(b) by 766 days.

(21) Appl. No.: 10/013,034

(22) Filed: Oct. 30, 2001

(65) Prior Publication Data

US 2003/0101047 A1 May 29, 2003

(51) Int. Cl.
*G06F 17/27* (2006.01)
*G06F 17/20* (2006.01)

(52) U.S. Cl. .............................. 704/9; 704/1
(58) Field of Classification Search ............... 704/9, 704/257
See application file for complete search history.

(56) References Cited

U.S. PATENT DOCUMENTS

| | | | | |
|---|---|---|---|---|
| 5,265,014 A | * | 11/1993 | Haddock et al. | 704/9 |
| 5,642,519 A | | 6/1997 | Martin | 395/759 |
| 5,729,659 A | | 3/1998 | Potter | 395/2.79 |
| 5,794,050 A | * | 8/1998 | Dahlgren et al. | 717/144 |
| 5,991,364 A | | 11/1999 | McAllister et al. | 379/88.01 |
| 6,026,388 A | | 2/2000 | Liddy et al. | 707/1 |
| 6,076,088 A | | 6/2000 | Paik et al. | 707/5 |
| 6,107,935 A | | 8/2000 | Comerford et al. | 340/825.31 |
| 6,125,342 A | * | 9/2000 | Selesky | 704/9 |
| 6,157,848 A | | 12/2000 | Bareis et al. | 455/563 |
| 6,233,547 B1 | * | 5/2001 | Denber | 704/9 |
| 6,343,266 B1 | * | 1/2002 | Paul et al. | 704/9 |
| 6,456,978 B1 | * | 9/2002 | Wymore et al. | 704/275 |
| 6,604,090 B1 | * | 8/2003 | Tackett et al. | 706/11 |
| 2005/0216443 A1 | * | 9/2005 | Morton et al. | 707/3 |

FOREIGN PATENT DOCUMENTS

WO    WO 98/09228    3/1998

OTHER PUBLICATIONS

Lappin, Shalom. Leass, Herbert J. "An Algorithm for Pronominal Anaphora Resolution", Computational Linguistics vol. 20, issue 4, Dec. 1994, pp. 535-561.*

* cited by examiner

*Primary Examiner*—David Hudspeth
*Assistant Examiner*—Matthew J Sked
(74) *Attorney, Agent, or Firm*—Mintz, Levin, Cohn, Ferris, Glovsky and Popeo, P.C.

(57) ABSTRACT

A method and system for pronoun disambiguation adapts or learns from evaluating input by the user. The system stores pronoun information relating to pronoun usage for people, entities, and things that a user can use a pronoun to refer to in interacting with the system. The pronoun information is used by the system in a process that interprets the meaning of the pronoun in the context of the interaction with the user. The system and method include matching the pronoun reference input by the user to the likely person or thing based upon an evolving pronoun preference associated with the person, entity or thing. During each interaction, the system and method permit the user to verify that the system interpreted the pronoun as referring to the correct person, entity or thing and modifies the stored pronoun information to reflect the verified usage. The system and method can select pronoun preferences when a user adds an entry into their address book by searching for information that can indicate the proper pronoun preference for a given entry. The pronoun preference can be selected based upon information in the user's address book and/or other sources of pronoun information such as other users' address books and system databases.

24 Claims, 5 Drawing Sheets

METHOD AND SYSTEM FOR PRONOUN DISAMBIGUATION

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

BACKGROUND OF THE INVENTION

This invention relates to user interfaces which permit the use of pronouns and, more particularly, to a method and system for disambiguation of pronouns used in a user interface.

In a voice user interface, such as a voice personal assistant with an address book, it is often convenient to allow the user to use pronouns. For example, after the user has listened to a message from John Jones, he should be able to say "call him back," in order to return the call. However, the use of pronouns introduces the difficulty that the entries (e.g. people and organizations) in the user's address book may be male, female, or corporations, such that the pronouns him, her, it, and them are possible inputs by the user in a given interaction.

One method of processing input containing pronouns is to allow the user to use pronouns indiscriminately. In this method, all pronouns are allowed and equivalent in the grammar or user response and the system assumes that the user will use the pronoun that is appropriate. Even if the user does not use the right pronoun, the pronoun equivalency will probably result in the system performing the correct action (the action the user intended). This is the method most systems use today.

However, in these prior art systems, the system is receiving (and the user is speaking) information that is essentially being disregarded. With the problems that exist with speech recognition today, even this small amount of information could help to improve recognition. It should also be noted that in some cases (common first names, some company names), it is easy to select a pronoun for a given name, but in other cases (the proverbial boy named Sue, or more common names like Jan, Jordan, Randy, Sandy and Shelly) it is quite likely to be incorrect. This means that if the system assigns a gender to each possible entry based on the noun identifier or name provider, the gender may be inappropriate. In this case, it is not just a grammatical issue; the system is more difficult to use, as it requires the user to learn an assigned "gender" which may have little basis in reality.

Some programs allow the user to provide gender-indicating information, for example a title like Mr. or Mrs. However, not all programs allow (or require) users to specify a title and those that do typically also accept titles (e.g. Dr., Hon., or Gen.) that are gender-neutral. In addition, it is not uncommon for a user to be unaware of the gender of a person in their address book, particularly if all of their communication has been via email or other written correspondence.

Accordingly, it is an object of the present invention to provide an improved user interface.

It is another object of the present invention to provide a method and system for using pronouns in a user interface.

It is a further object of the present invention to provide a method and system for disambiguating the use of pronouns in a user interface.

SUMMARY OF THE INVENTION

The present invention is directed to a method and system for disambiguating pronouns used by a user during an interaction with the system. The method and system according to the invention allow the user to input pronoun references to nouns or proper nouns used in the context of the interaction. The method and system associate pronoun references with nouns and proper nouns input by a user and learn or modify the associated pronoun references through experience based upon usage by a user.

The system can include a user reference database (such as a user address book) which lists entries by one or more identifiers or names. The user reference database can include one or more fields or records for including pronoun reference information to be associated with each entry. Alternatively, the system can include a separate pronoun database which provides pronoun references associated with entries in a user reference database. When a user inputs a new entry into the reference database, the user can be prompted or required to input pronoun reference information (either directly "him" or "her" or indirectly Mr. or Mrs.). Alternatively (or in addition), the system can include a search component for searching entries in one or more databases for entries having the same as or similar identifier information to a given entry in the user reference database and assigning a pronoun designation as a function of the results of the search. The search component can be adapted to search any or all of the available databases, including the user reference database, a default pronoun database of common identifiers, a unified user reference database and/or a plurality of user reference databases.

The system can also include a historical list of references to nouns and proper nouns used during the interaction between the user and the system. The historical list can be a list of all nouns to which the user and/or the system has referred within a given session. The list can be limited to nouns mentioned (or referred to via pronouns) within a given time period, number of utterances, number of nouns, or other constraint. Upon receiving input from a user containing a pronoun reference, the system can be adapted for using the pronoun information contained in one or more databases to determine the noun or proper noun that the pronoun could refer to. The system can be adapted to compare an input (or recognized) pronoun received by the system with a listing of pronouns corresponding to one or more of the nouns or proper nouns in the historical list, in order to properly interpret the user's input. The system can select the record in the user reference database corresponding to a noun or proper noun as a function of the order in the historical list (e.g. the most recent) and the pronoun preference associated therewith. The system can use the information contained in that record as needed to complete the task requested by the user. The pronouns corresponding to the nouns or proper nouns in the historical list can be initially selected by the system as a function of 1) a predefined system database that associates identifiers of nouns and proper nouns; 2) the user reference database; 3) a unified user reference database and/or a other databases or sources of pronoun reference information. After the initial selection, the pronoun preference information can be modified as a function of usage.

After the system has selected an entry corresponding to one of the most recently identified nouns or proper nouns in the history list that matches the pronoun recognized by the system, the system can prompt the user to verify the entry selected by the system. Based upon the user response, the system can update or modify the pronoun information in one of the system databases to permit the system to learn or adapt based upon pronoun usage. For example, where the user verifies the correct selection, a value for the pronoun associated with noun or proper noun selected can be incremented or modified in recognition of the accepted usage or where the user indicates an incorrect selection, a value for the pronoun associated with noun or proper noun selected can be decremented or modified in recognition of the unaccepted usage.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENTS

The present invention is directed to a system for providing a user interface which can accept and interpret input containing pronouns. The system can learn or modify pronoun preferences by storing pronoun preference information and by modifying that pronoun preference information based upon usage. The present invention is also directed to a method for interpreting input which contains pronouns using pronoun preference information. The method can include storing pronoun preference information and modifying the pronoun preference information based upon usage. In order to facilitate a better understanding, the invention is described below with respect to one or more illustrative embodiments from which a person having ordinary skill in the field can make and use the invention.

Figure 1:
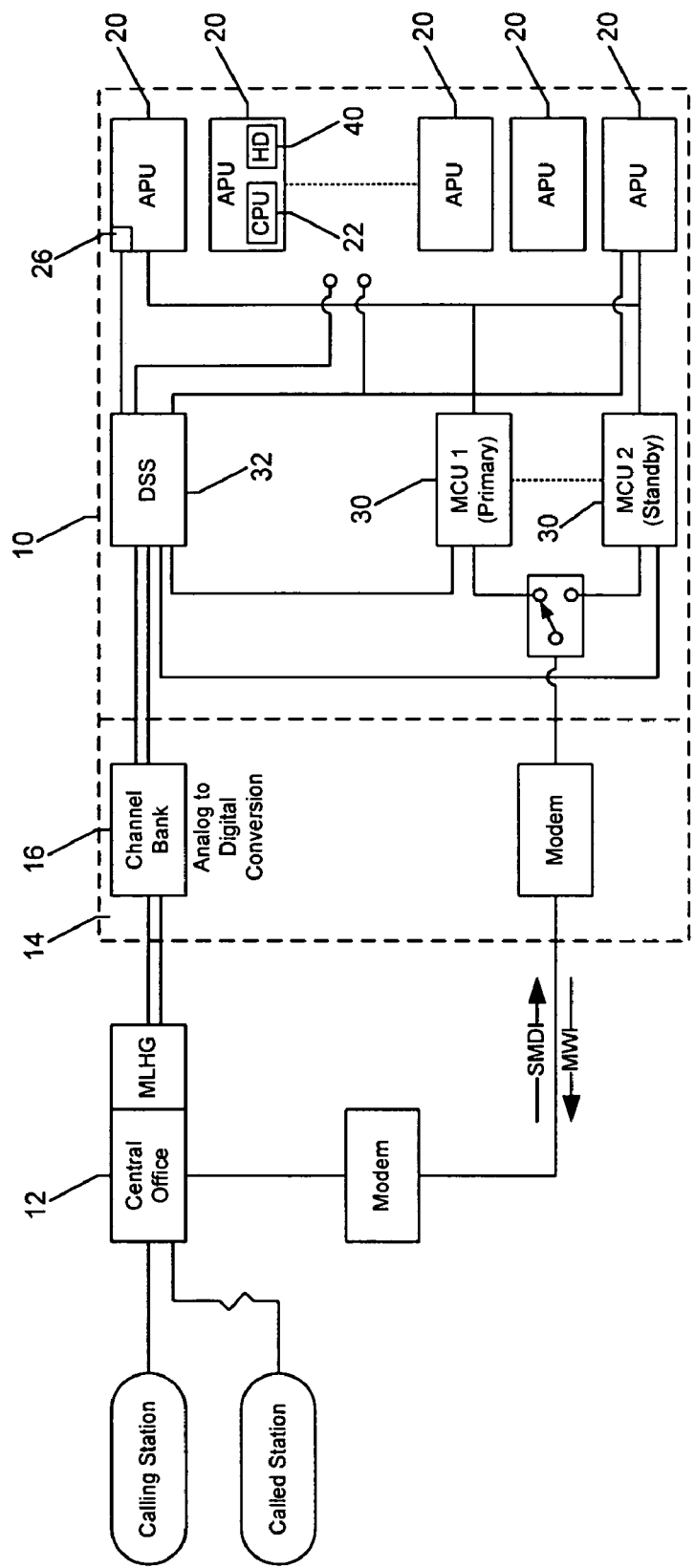
FIG. 1 is a system for providing a voice based personal assistant in accordance with the present invention.

FIG. 1 shows a system 10 for providing a voice based user interface in accordance with the present invention. The system 10 is, in part, a conventional information services system as described in U.S. Pat. Nos. 5,029,199; 5,263,080; 5,193,110; 5,659,599; 5,524,139; and 5,402,472, all assigned to Comverse Network Systems, Inc. of Wakefield, Mass. and incorporated herein by reference. The System 10 is connected to a Central Office 12 into which users may call and include optional telephone network interface circuitry 14 including Channel Bank 16. The system 10 further includes one or more Master Control Units (MCU) 30 that control digital switching system 32 to route calls from the central office 12 to one or more of the application processing units (APU) 20. Each APU 20 can include a computer having a central processing unit (CPU) 22 and data storage (HD) 40 and telephone network termination, such as a T1 termination that can provide up to 24 voice ports or telephone interface ports 26. The APU 20 performs the user call processing and allows the user access to user and system data stored in data storage 40 or other system storage (not shown).

Figure 2:
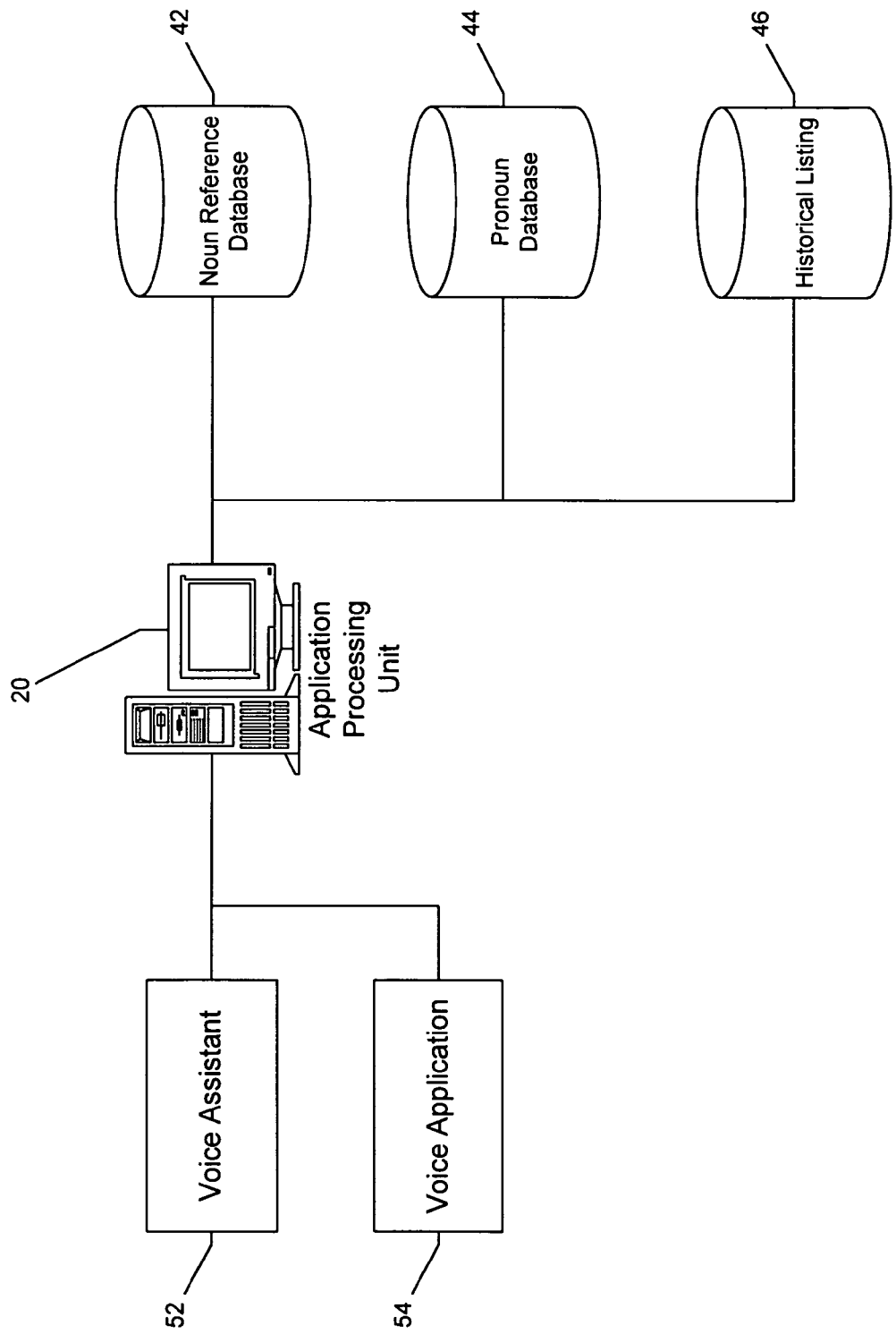
FIG. 2 is a diagrammatic view of an application processing unit in accordance with the present invention.

FIG. 2 shows a diagrammatic view of an application processing unit 20 in accordance with the present invention. The APU 20 can include a noun reference database 42, a pronoun reference database 44 and a historical listing 46. The APU 20 can further include a voice assistant 52 that can facilitate user interaction with one or more voice applications 54. The voice assistant 52 can allow a user to interact with one or more voice applications 54 using spoken commands and numeric keypad input.

For purposes of illustration, the present invention is described herein with respect to a voice personal assistant which allows a user to access a voice application, such as a voice messaging system. The voice messaging system can provide a noun reference database, for example, an address book which provides telephone numbers and/or email addresses associated with nouns and proper nouns (such as individual people or organizations) by a unique noun identifier such as a name. The names can be entered into the address book by the user or the system can enter the names based upon external input, such as caller ID data or other caller data (including speech recognition of caller input data). The voice personal assistant 52 can track the nouns and proper nouns used or referenced by the user in the historical listing 46 which can include a chronological listing (or database) of names used by either the user or the voice personal assistant 52 or both within a session, time period or other constraint.

APU 20 can be an IBM Compatible computer based upon an Intel (Intel Corp., Santa Clara, Calif.) or compatible microprocessor and running a Microsoft Windows (Microsoft Corp., Redmond, Wash.), Unix based or Linux based operating system. The APU 20 can include RAM and non-volatile storage, such as a hard disk, and a network interface (e.g. Ethernet or Fast Ethernet—not shown). The network interconnects each of the APUs 20 and the MCUs 30 to allow information to be sent between them. The system can further include a network storage device (not shown) which can allow one or more APUs 20 or MCUs 30 to store and access data from a common location.

In accordance with the invention, the system can further provide a means for associating one or more pronoun preferences with one or more the entries in the address book. This can be accomplished, for example, by providing additional fields in the address book for pronoun information or by providing a separate pronoun database 44 which is linked to one or more entries in the address book.

Table 1 provides an example of a pronoun database or log in accordance with the present invention.

TABLE 1

| Noun Identifier | Him | Her | Them | It | User |
|---|---|---|---|---|---|
| John | 4 | | | | Tim Smith |
| Pat | | 3 | 1 | | User1234 |
| American Airlines | 1 | | 10 | 2 | Admin |
| Weather | | | | 6 | 99-1234 |

The pronoun database can include a listing of noun identifiers or names and one or more pronoun fields which keep a count of the number of times that the user referred to the noun (e.g. the person or organization) by a specific pronoun (e.g. him, her, them or it). The pronoun fields can be part of the user's address book or provided as part of a separate pronoun database.

Where a separate pronoun database is provided, it is not necessary for the system to include a noun reference database, such as an address book. For example, where the system provides simple voice mailbox services, which does not provide a user address book, the system can create and maintain a pronoun database transparent to the user. The separate pronoun database can be specific to a given user or a global database common to all users. Where the separate pronoun database is common to all users, it can be linked, such as via a USER field to a specific user of the system.

The structure of the pronoun database can be adapted based upon the needs of the system and the language of the system users. For example, a system which only references people might only track the masculine and feminine pronouns (e.g. him and her) and similarly, a system which only references organizations or business entities might only track singular and plural pronouns (e.g. it and them). A system which uses a non-English language can track other pronouns as can be appropriate (such as "ellos," the masculine third person plural pronoun in Spanish). In addition, a single field can be used to track mutually exclusive pronoun preferences, for example, a masculine/feminine pronoun field can track usage by its numeric value whereby, for example, a positive number is indicative of feminine preference and a negative number is indicative of a masculine preference and the value is adjusted by adding or subtracting adjustment units based upon usage. A zero value could invoke a default preference or can be designated not valid (i.e. adding 1 to −1 changes the value to +1 or using odd number and an adjustment unit value of 2). Alternatively, field could range from 1 to 10 where 1 indicates a strong preference toward, for example, a singular pronoun and 10 indicates a strong preference for a plural pronoun. In addition, the field values can be limited to prevent them getting too large and overflowing the field limit. For example, the values can be limited to +10 and −10 or in from 1 to 10 and the modification process can be adapted to increment the field up to the limit value whereby increments beyond the limit value are ignored.

For example, the data in Table 1 could appear as in Table 2, where in the masculine-feminine (M/F) field, the field range is −10 to +10 and a negative value indicates a masculine preference and a positive value indicates a feminine preference and in the singular-plural (S/P) field, the range is 1 to 10 and a value closer to 1 indicates a singular preference and a value closer to 10 indicates a plural preference.

TABLE 2

| Noun Identifier | M/F | S/P | User |
| --- | --- | --- | --- |
| John | −4 |  | Tim Smith |
| Pat | 3 | 6 | User1234 |
| American Airlines | −1 | 8 | Admin |
| Weather |  | 1 | 99-1234 |

Figure 3:
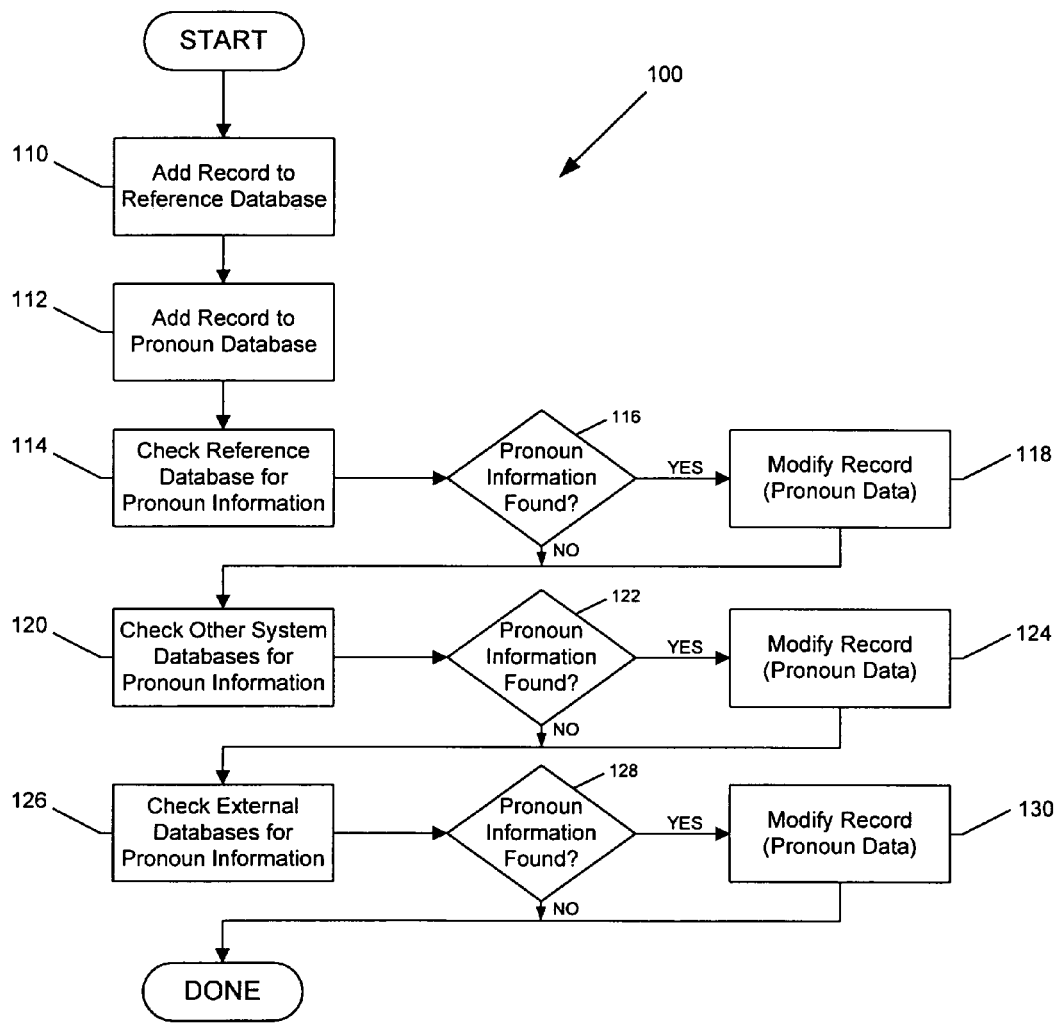
FIGS. 3 and 4 show flow charts of processes for associating pronoun references with identifiers or names in a reference database in accordance with the present invention.

FIG. 3 shows a flow chart of a process 100 for creating a pronoun database in accordance with the present invention. In the process described, the system includes a separate pronoun database that is linked to the user reference database (the address book in our illustrative example). The process 100 starts at step 110 where a record is added to the noun reference database. A user can add the record, a new entry in their address book, or the system can add the entry upon receipt of an incoming call (with caller ID services or call input information) or receipt of a voice message or other external communication from which the necessary information can be derived. When a record is added to the user's address book, a corresponding entry can be added in the user's pronoun database in step 112. For example, if John Smith is added to the user's address book, an entry for John Smith is also added to the user's pronoun database. At step 114, the system searches the noun reference database for pronoun information. This includes searching the newly created entry in the noun reference database for gender information. If the noun reference database includes one or more gender specific fields in step 116, the information from those fields can be used to determine a pronoun preference and modify the entry in the pronoun database in step 118. For example, in the user address book the system can search for titles such as Mr. and Mrs. or even a specific male or female designation in the newly added record. The system can also search other records in the noun reference database for matching or similar entries. Where the noun references match in step 116, the information can be used to modify the entry in the pronoun database in step 118. For example, the given name John may match other address book entries and the pronoun information (masculine) associated with the other entries in the pronoun database can be used to formulate the pronoun preference for the newly created entry in the pronoun database. Optionally, the system can be configured to search other system or external databases in addition to or instead of searching the noun reference database. For example, if no pronoun information is found in step 116, the system can continue the search for more pronoun information in step 120 (and if no information is found, leave a predefined entry, such as a blank entry or a default value).

In step 120, the process can continue to search other system databases for pronoun information. If pronoun information is found in step 122, the information can be used to modify the entry in the pronoun database in step 124. The other system databases can include other user reference databases and user pronoun databases, a default system pronoun database which includes predefined default values for many possible name entries. If no pronoun information is found at step 122, the system can optionally proceed to step 126 in order to search external databases.

In step 126, the process can continue to search external databases for pronoun information. If pronoun information is found in step 128, the information can be used to modify the entry in the pronoun database in step 130. External databases can include searching the Internet or establishing a connection, for example over a network, with a remote system that provides pronoun information. If no pronoun information is found at step 128, the process ends. If no pronoun information is found at this (or any other) point, the process can include a step (not shown) whereby a default pronoun preference, such as her or it is used.

It should be appreciated that it is not necessary for the system to include a noun reference database, such as a user address book. Where the user receives a voice message from caller, the system implementing the process above in accordance with the invention can add an entry for the caller in a pronoun database of the user based upon the available information. The system can use, for example, caller ID to determine the caller's telephone number and use the telephone number to retrieve the caller's name or prompt the caller for any needed information.

Figure 4:
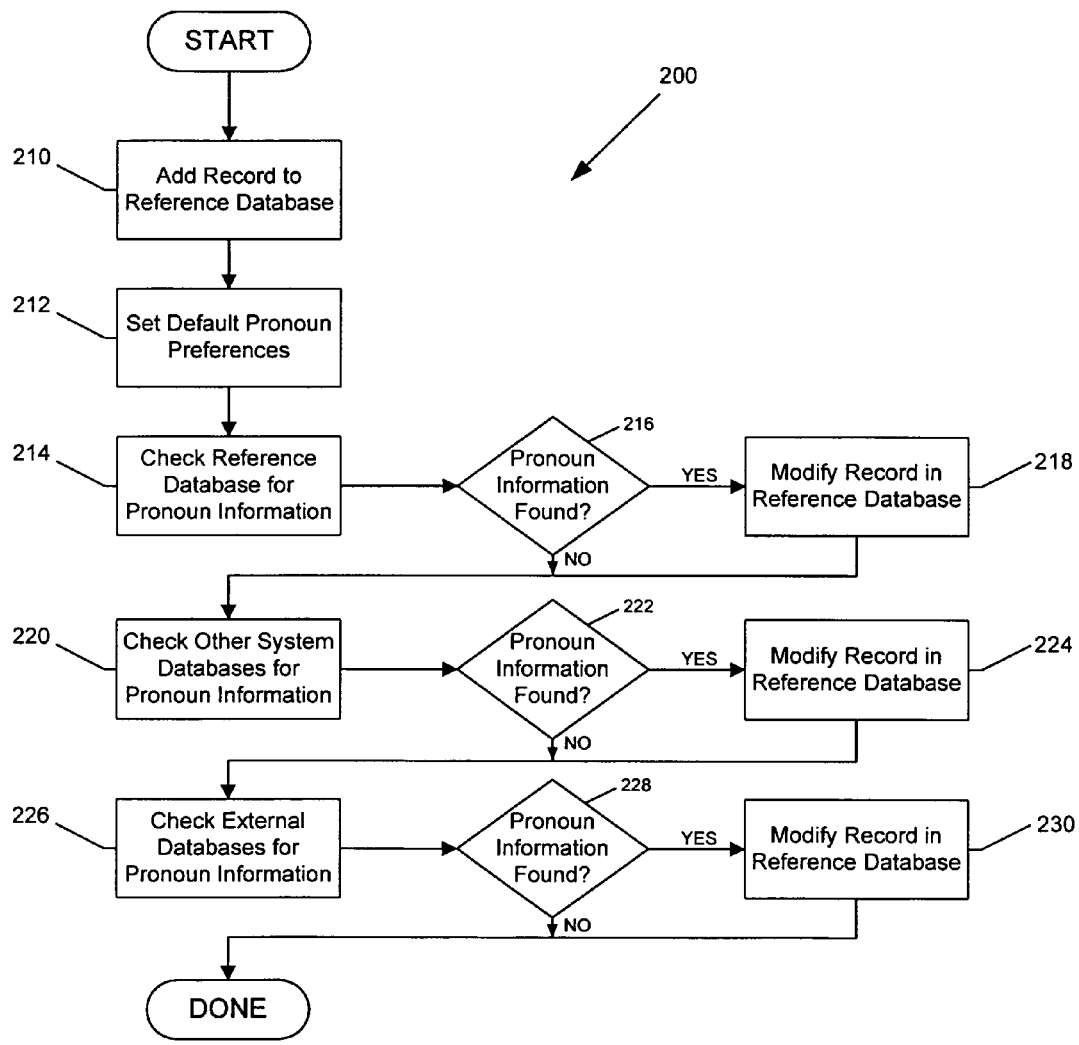

FIG. 4 shows a flow chart of a process 200 for creating a pronoun database in accordance with the present invention. In the process described, the pronoun data is included as part of the user reference database (the address book in our illustrative example). The process 200 starts at step 210 where a record is added to the noun reference database. A user can add the record, a new entry in their address book or the system can add the entry upon receipt of an incoming call (with call ID services or call input information) or receipt of a voice message or other external communication from which the necessary information can be derived. When a record is added to the user's address book, default information can be added in the pronoun data fields of the address book in step 212. For example, if John Smith is added to the user's address book, an entry for "him" is also added to the user's address book. This entry can be purely arbitrary, "it" for all entries or the information can be determined as a function of additional information obtained in the succeeding steps. At step 214, the system searches the noun reference database for pronoun information. This includes searching the newly created entry in the noun reference database for gender information. If the noun reference database includes one or more gender specific fields in step 216, the information from those fields can be used to determine a pronoun preference and modify the pronoun information in the noun reference database in step 218. For example, in the user address book the system can search for titles such as Mr. and Mrs. or even a specific male or female designation in the newly added record. The system can also search other records in the noun reference database for matching or similar entries. Where the noun references match in step 216, the information can be used to modify the pronoun information in the noun reference database in step 218. For example, the given name John may match other address book entries and the pronoun information (masculine) associated with the other entries in the pronoun database can be used to formulate the pronoun preference for the newly created entry in the user address book. Optionally, the system can be configured to search other system and external databases in addition to or instead of searching the noun reference database. For example, if no pronoun information is found in step 216, the system can continue the search for more pronoun information in step 220 (and if no information is found, leave a default value).

In step 220, the process can continue to search other system databases for pronoun information. If pronoun information is found in step 222, the information can be used to modify the pronoun information in the noun reference database in step 224. The other system databases can include other user reference databases and user pronoun databases, a default system pronoun database which includes predefined default values for many possible name entries. If no pronoun information is found at step 222, the process can optionally continue to step 226 in order to search external databases.

In step 226, the process can continue to search external databases for pronoun information. If pronoun information is found in step 228, the pronoun information can be used to modify the pronoun information in the noun reference database in step 230. External databases can include searching the Internet or establishing a connection, for example over a network, with a remote system that provides pronoun information. If no pronoun information is found at step 228, the process ends. If no pronoun information is found at this (or any other) point, the process can include a step (not shown) whereby a default pronoun preference, such as her or it is used.

In accordance with system and method of the present invention, the pronoun information obtained from the various sources searched can be weighted. Thus, for example, where a record for Pat indicates a gender specific title such as Mr., the information can be weighted higher than another record which does not include a gender specific title and only indicates that the first name "Pat" uses a feminine pronoun. Specific examples include: Gender specific fields in the user address book (Mr., Ms., Mrs., etc.) can be weighted at 10 points; Object specific fields in the user address book (e.g. a "Company name") can be weighted at 10 points as "them"; Entries added to the user's address book using a specific pronoun (e.g. "add him to my address book") can be weighted at 1 point (this low weight value is due to the possibility of the user or the recognition being incorrect); The most common gender for the same first name in the user's address book, all address books in the system, or an external database can be weighted at 5 points; The most common pronoun for the same first name in all address books in the system can be weighted at 10 points; The most common gender for the same first name from a country specific (to the person) database or shared system address book can be weighted at 10 points; A database of known companies (from, for example, a stock market or other company listing) can be weighted at 10 points.

Figure 5:
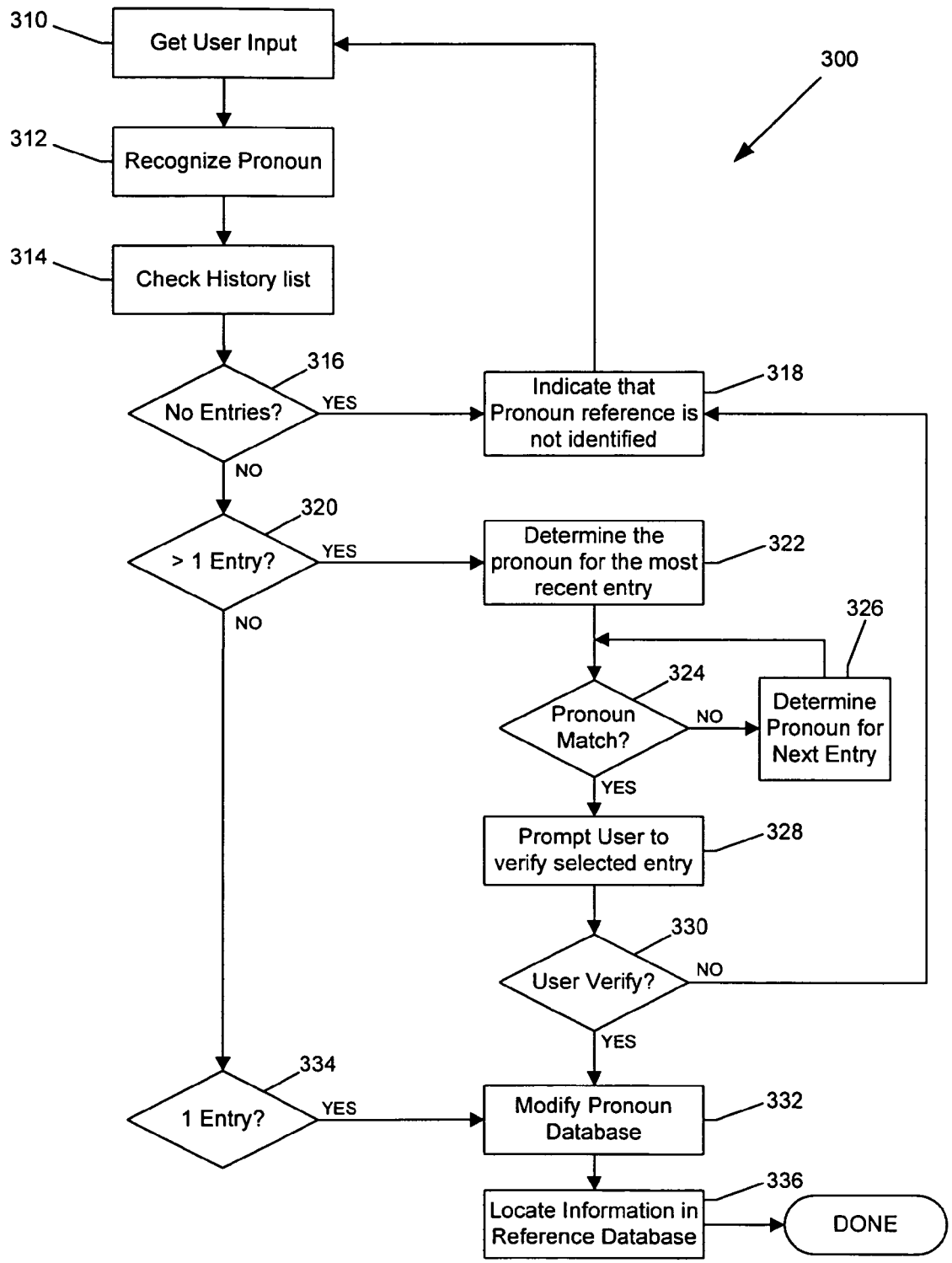
FIG. 5 is a flow chart for interpreting pronoun references and learning pronoun preferences in accordance with the present invention.

FIG. 5 shows a flow chart of a process 300 for interpreting pronoun references and learning pronoun preferences in accordance with the present invention. The process 300 begins at step 310 wherein the user provides input that includes a pronoun and the pronoun is recognized by the system at step 312. Upon recognition of the pronoun in step 312, the system examines the history list in step 314 in order to interpret the pronoun. If there are no entries in the history list at step 316, the system indicates to the user "I am not sure who him/her/them/it refers to, please enter a name" in step 318 and returns to step 310 for more input from the user. If there are many entries in the history list in step 320, the pronoun preference for the most recently used entry in the history list can be determined in step 322 and compared with the pronoun recognized in step 324. If the pronouns match in step 324, the user can be prompted whether the correct entry was selected in step 328. If the user approves the selection in step 330, the pronoun information for that selection is modified as a result of the successful interpretation of the pronoun at step 332. The process proceeds to step 336 where the selected entry is used to perform a task, such as for example, place a telephone call or send a voice mail or e-mail message.

If the pronoun preference for the most recently used entry in the history list does not match the pronoun recognized, the process enters a loop which determines and compares the pronoun preference for each entry in the history list, from most recent to least recent, until the pronoun determined matches the pronoun recognized or some process defined limit is reached (for example, after considering the 5 or 10 most recent entries in the history list). After a match is found, the process proceeds to step 328 to verify the selection and, if verified, modify the pronoun information and perform the requested task.

If there is only one entry in the history list at step 320, the process continues to step 334 where the selected entry is used to perform a task, such as for example, place a telephone call, send a voice mail or e-mail message.

The sample dialog below provides further illustration and understanding of the present invention:

USER: Play my messages
SYSTEM: You have a message from John Jones . . . "Please talk to Pat Smith today about the project; it's due on Friday."
USER: Call Pat Smith.
SYSTEM: Calling Pat Smith. <ring> There is no answer from Pat Smith. Please record a voice message. <beep>
USER: Hi, Pat, do you have time to talk at 3? I'll be in all morning.
SYSTEM: Message sent to Pat Smith.
USER: Call him back.

In this example, "Call him back" could either indicate that the user wants to call John, for example, to tell him that he has tried to schedule a meeting with Pat, or that the user wants to call Pat, for example, because he has just realized that he already has a three o'clock meeting and needs to send another message to Pat Smith to change the meeting time.

If this dialogue happens, and the pronoun data in database is as shown in Table 3, Pat is usually referred to with a female pronoun. Thus the system will assume that the user means John, and will say "Calling John Jones, if this is wrong, say cancel." If the user says cancel, nothing is recorded in the pronoun log. If not, this is counted as a successful use of the male pronoun for John and the pronoun information in the Him field of John is increased to 5.

TABLE 3

| Name | Him | Her | Them | It |
|------|-----|-----|------|-----|
| John | 4   |     |      |    |
| Pat  |     | 3   |      | 1  |

If, on the other hand, the pronoun log is as described in Table 4, the hypothesis will be that "him" refers to Pat, as Pat is the most-recently-mentioned person for whom the preference could be male.

TABLE 4

| Name | Him | Her | Them | It |
|------|-----|-----|------|-----|
| John | 4   |     |      |    |
| Pat  | 2   | 1   |      | 1  |

In another embodiment, the pronoun database entries can consist of a name from the address book and an ordered linked list of symbols representing the pronouns in the historical order used in the system by the user as shown in Table 5. When a new entry is added to the address book, the system compiles all available pronoun information and adds the appropriate pronoun to the end of the linked list for each piece of pronoun information considered. Multiple copies of a pronoun can be added if the pronoun information has a high weighting, for example, if the pronoun information is rated as weighted at ten points in the previous example. If at any point the linked list has more than N members (for example, nine in this instantiation), the first element or the oldest element can be dropped.

TABLE 5

| Name  | Pronoun Usage |
|-------|---------------|
| John  | him, him, him, him, |
| Pat   | him, her, him, him |
| Chris | him, him, him, him, her, him, her, her |

When the user speaks a pronoun, the system will go through each of the possible entries in the history list and count the number of each pronoun in the linked list associated with each entry. If there is a clear majority, then that pronoun will be associated with the name. The pronouns in the linked list can be weighted based upon their age, such that the most recently entered pronoun on the list may be worth three times the oldest entry on the linked list (assuming that the user will eventually meet the person or otherwise determine the correct gender of the person in their address book). In addition, multiple pronouns can be associated with a particular name.

One advantage of this embodiment is that it allows the system to be responsive to the user's vocabulary choice. If, for instance, the user finds that she has been using the wrong pronoun for a contact, the system will quickly learn the new usage with no additional work on the part of the user.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method of interpreting a pronoun, the method comprising:
    A) recognizing a user input as containing a recognized pronoun;
    B) comparing said recognized pronoun to pronoun information associating the historical noun references with pronoun number and gender information;
    C) selecting one of said historical noun references as a function of said comparison between said recognized pronoun and said pronoun information; and
    D) updating said pronoun information as a function of a successful selection of said historical noun reference.

2. A method according to claim 1 wherein in C), the selecting of one of said historical noun references is determined as a function of historical usage of a pronoun with respect to each of the noun references.

3. A method according to claim 2 wherein said historical usage includes maintaining a count of correct usage events of a given pronoun with respect to a given noun reference.

4. A method according to claim 1 wherein in C), said historical noun references are selected based upon a match of said recognized pronoun with at least one of said associated pronoun preferences.

5. A method according to claim 1 wherein in B), said recognized pronoun is compared to at least one of said associated historical noun references in order from most recent to least recent in said historical listing.

6. An apparatus for interpreting a pronoun comprising:
    a recognizer adapted to recognize a user input as containing a recognized pronoun;
    a historical listing of noun references and associated pronoun information associating the historical noun references with pronoun number and gender information;
    means for comparing said recognized pronoun to said associated pronoun information;
    means for selecting one of said noun references of said historical listing as a function of said comparison between said recognized pronoun and said associated pronoun information; and means for updating said pronoun information as a function of a successful selection of one of said noun references.

7. An apparatus according to claim 6 further comprising means for determining an associated pronoun preference as a function of historical usage of a pronoun with respect to the noun reference.

8. An apparatus according to claim 7 wherein said historical listing includes a count of correct usage events of a given pronoun with respect to a given noun reference.

9. An apparatus according to claim 6 wherein said noun reference is selected based upon a match of said recognized pronoun with said associated pronoun information.

10. An apparatus according to claim 6 wherein said means for comparing is configured to compare each recognized pronoun to said pronoun information associated with said historical noun references in chronological order from most recent historical noun reference to least recent historical noun reference.

11. A method of interpreting a pronoun in a voice user interface comprising:
  A) recognizing a user utterance as containing a recognized pronoun;
  B) comparing said recognized pronoun to pronoun information associating the historical noun references with pronoun number and gender information;
  C) selecting a record from a database corresponding to one of said historical noun references as a function of said comparison between said recognized pronoun and said pronoun information; and
  D) updating said pronoun information as a function of a successful selection of said record.

12. A method according to claim 11 wherein D), the record is selected as a function of historical usage of a pronoun with respect to each of the noun references.

13. A method according to claim 12 wherein said historical usage includes a count of correct usage events of a given pronoun with respect to a given noun reference.

14. A method according to claim 11 wherein B) includes comparing said recognized pronoun to said pronoun information in chronological order from most recent to least recent.

15. A method according to claim 11 further comprising:
  E) placing a telephone call to a telephone number in said selected record of said database.

16. A method according to claim 11 further comprising:
  E) sending an electronic message to an address in said selected record of said database.

17. An apparatus for interpreting a pronoun in a voice user interface comprising:
  a recognizer adapted to recognize a user input as containing a recognized pronoun;
  a historical listing of noun references and associated pronoun information associating the historical noun references with pronoun number and gender information;
  means for comparing said recognized pronoun to said pronoun information;
  means for selecting a record from a database corresponding to one of said historical noun references as a function of said comparison between said recognized pronoun and said pronoun information; and
  means for updating said pronoun information as a function of a successful selection of said historical noun reference.

18. An apparatus according to claim 17 further comprising:
  means for determining an associated pronoun preference as a function of historical usage of a pronoun with respect to said noun reference.

19. An apparatus according to claim 18 wherein said historical usage includes a count of correct usage events of a given pronoun with respect to a given noun reference.

20. An apparatus according to claim 17 wherein said means for comparing is configured to compare each recognized pronoun to said pronoun information associated with said historical noun references in chronological order from most recent historical noun reference to least recent historical noun reference.

21. An apparatus according to claim 17 further comprising:
  means for placing a telephone call to a telephone number in said selected record of said database.

22. An apparatus according to claim 17 further comprising: means for sending an electronic message to an address in said selected record of said database.

23. A system providing for user interaction comprising:
  a voice personal assistant adapted to presenting prompts to and receiving responses from a user;
  said voice personal assistant including a recognizer adapted for recognizing responses that include pronouns, received from the user;
  means for maintaining a historical list of noun references;
  means for comparing a recognized pronoun to pronoun information associated with historical noun references, the pronoun information including pronoun number and gender information;
  an application adapted for performing at least one function for said user;
  means for selecting one of said historical noun references as a function of a comparison between a recognized pronoun with said pronoun information;
  utilizing a selected one of said noun references in performing a function of said application; and
  means for updating said pronoun information as a function of a successful selection of said historical noun reference.

24. A system providing for user interaction comprising:
  a voice personal assistant adapted to presenting prompts to and receiving responses from a user;
  said voice personal assistant including a recognizer adapted for recognizing responses that include pronouns, received from the user;
  a historical list of noun references;
  a pronoun cross-reference associating pronoun information with at least one noun reference in said historical list the pronoun information including pronoun number and gender information;
  a first subsystem adapted for selecting one of said noun references of said historical listing as a function of a comparison between a recognized pronoun with associated pronoun information in said pronoun cross-reference;
  an application adapted for performing at least one function for said user utilizing a selected one of said noun references in performing a function of said application.; and
  a second subsystem configured to update said pronoun information as a function of a successful selection of said historical noun reference.

* * * * *